United States Patent
Randhawa (10) Patent No.: US 12,458,470 B2
(45) Date of Patent: Nov. 4, 2025

(54) DENTAL MATERIAL DISPENSER SYSTEM WITH MARKING

(71) Applicant: Jagjot Randhawa, Brampton (CA)

(72) Inventor: Jagjot Randhawa, Brampton (CA)

( * ) Notice: Subject to any disclaimer, the term of this patent is extended or adjusted under 35 U.S.C. 154(b) by 266 days.

(21) Appl. No.: 18/239,010

(22) Filed: Aug. 28, 2023

(65) Prior Publication Data
US 2025/0072995 A1 Mar. 6, 2025

(51) Int. Cl.
*A61C 5/62* (2017.01)
*A61C 5/00* (2017.01)
*A61C 9/00* (2006.01)

(52) U.S. Cl.
CPC .......... *A61C 5/00* (2013.01); *A61C 5/62* (2017.02); *A61C 9/0026* (2013.01)

(58) Field of Classification Search
CPC .... A61C 5/00; A61C 5/50; A61C 5/55; A61C 5/60; A61C 5/62; A61C 5/64; A61C 5/66; A61C 9/0026
See application file for complete search history.

(56) References Cited

U.S. PATENT DOCUMENTS

2012/0064481 A1* 3/2012 Cannon ............... B65D 83/761
    433/90
2021/0113301 A1* 4/2021 Pauser .................... A61C 5/62

FOREIGN PATENT DOCUMENTS

DE    202008007801 U1 *  8/2008 ....... B05C 17/00593
JP      2014516606 A  *  7/2014 ........... B65D 83/761

* cited by examiner

*Primary Examiner* — Edward Moran
(74) *Attorney, Agent, or Firm* — Nasser Ashgriz; UIPatent Inc.

(57) ABSTRACT

The present invention is a dental material carrier and a dispenser gun thereof configured to mark the amount of a dental material used or remained in the dental material carrier. The dental material carrier comprises a body with opaque scratchable colored markings and to be pre-loaded with a predetermined amount of a dental filling material. The dispenser gun having a housing configured to receive the dental material carrier and a piston with an extended metal bar attached to the piston. The metal bar having a pin to scratch the markings on the dental material carrier. In one embodiment the dispenser gun further has a locking mechanism to provide a one way advancement of the piston and lock the piston at the point of usage of the dental material used inside the carrier. In another embodiment the marking element is an O-ring.

3 Claims, 13 Drawing Sheets

DENTAL MATERIAL DISPENSER SYSTEM WITH MARKING

FIELD OF THE INVENTION

The present invention relates in general to the restorative dentistry and in specific to a dental material dispenser for dispensing dental filling material with a marking system.

BACKGROUND OF THE INVENTION

In dentistry, various dental material carriers are known for the preparation and/or delivery of dental materials. These dental material carriers are in the form of a capsule known as a compule having a chamber containing a component material. For use, the compule has to be inserted into an applicator. These known applicators each have a body with a handgrip, a holder for receiving the compule in a removable manner, a piston, and a drive mechanism for the piston. When the compule sits in the holder and the drive mechanism is actuated by hand, the drive mechanism pushes the piston into the chamber from the rear, so that the piston initially bears on the piston and pushes it forwards. The material is dispensed from the chamber due to the advancement of the piston.

Dental materials such as composite, cements and etc. are packed in opaque containers as they are Light sensitive. Therefore, it is not possible to detect how much material is left inside the compules. For example, the dental composite filling material comes in black compules which cannot be seen through the compules. When the material inside the compules finish the dentist does not realize how much material is left inside the compule, specifically when they are in the middle of the procedure. Further, the dental material being relatively expensive, it is undesirable to leave any dental material remaining within the compule.

Furthermore, most dental cements and composite restorative materials come in compules without any markings to show how much of the material inside the compule is used, thereby the dentist could not realize the amount of the remaining material inside the compule. The delivery system of compules do not indicate how much material is used or is left inside the compule. In addition, existing dispensers such as delivery guns do not have a locking mechanism, so that when the trigger is released, the piston turns back to its oriented position. Therefore, the dentist has not any idea of how much of the dental material inside the compule is used.

As should be readily appreciated from the above, there are many instances in which an improved system is needed to provide better dental care system. The present invention provides a dental material dispenser with marking or tracing system to indicate the material used or mark how much material left inside the compule.

SUMMARY OF THE INVENTION

The present invention relates to an improved system for dispensing dental material. The system comprises a dental material carrier (compule) with an opaque body portion to protect the dental material contained therein from light and a dispenser device for dispensing the dental material.

In operation the compule has to be inserted into the dispenser device. In one embodiment the dispenser device is a delivery gun. The delivery gun has a housing configured to receive the compule in a removable manner, a handgrip and a piston with a drive mechanism. When the compule is placed in the housing and the drive mechanism is actuated by hand, the drive mechanism pushes the piston into the compule from the rear. The dental material is dispensed from the compule due to the advancement of the piston. Composite materials are packed in opaque containers as they are Light sensitive, therefore, it is not possible to detect how much material is left inside the compules. For example, the dental composite filling material comes in black compules which are not visible. Therefore, in operation the dentists do not realize how much material is left inside the compule, specifically when they are in the middle of the procedure. The present invention provides a system to solve this problem in various embodiments.

In one embodiment the delivery gun of the present invention has a marker placed thereon. In this case the compule provides scratchable colored markings on its body portion. The piston is attached with a small extended arm with a pin on its distal end which can scratch the colored markings on the compule. The scratched markings on the compule can show how much dental material is used or remained in the compule.

In another embodiment the dispenser device has a spring loaded piston The dispenser device includes a longitudinal bar attached adjacent to the piston and configured to move in respect to the piston. An O-ring is slidably provided which by advancement of the piston the O-ring slides forward from a first position to a second position and locks in place facilitating the marking of the amount of the material used or remained within the compule.

In yet another embodiment of the present invention the delivery device comprises a handle to receive a dental material carrier (Compule). The handle is rotated by hand to advance a screw type piston inside the compule for delivery of the dental material. The compule is made of an opaque material. In this embodiment the colored markings are provided on the screw piston to indicate the amount of material used or remained in the compule.

In yet another embodiment of the present invention the dispenser device has a locking mechanism to provide a one direction advancement of the piston. The dental material is dispensed by the advancement of the piston in one direction. The locking mechanism provides a one direction movement of the piston to move forward from a first position to a second position and prevent the piston to return back toward the first position. The piston is linearly shifted along an axis and lock in the position thereby, facilitating the marking of the amount of the material used or remained within the compule.

It is therefore an object of the present invention to assist the dentists to see the volume of material remaining in the compule so as not to start a procedure which may require more material than remains in the cartridge.

It is therefore an object of the present invention to help the dentists to know how much dental material is left inside the compule before the start and during the procedure, so the next compule is ready without interrupting the procedure.

It is another object of the present invention to mark the dental material left inside the compule.

It is another object of the present invention to avoid wasting costly dental material.

It is yet another object of the present invention to keep the dental material carriers opaque while indicating the material left therein.

BRIEF DESCRIPTION OF THE DRAWINGS

Embodiments herein will hereinafter be described in conjunction with the appended drawings provided to illus-

3 trate and not to limit the scope of the claims, wherein like designations denote like elements, and in which:

DETAILED DESCRIPTION OF PREFERRED EMBODIMENTS

The present invention is a dental material dispenser system to assist the operator to realize the amount of the dental material used or remained in the dental material carrier. Typically, the dental material contained within a dental material carrier (Compule) is sensitive to the light. The dental materials are stored in compules that are dark and are not see through. Therefore, in the application process the dentist cannot identify how much of the material is left inside the compule. The present invention provides solutions for this matter.

In one embodiment as shown in FIGS. 1 to 5 a dental material dispenser member in the form of a delivery gun or syringe 10 for use with a dental material carrier or compule 12 of the present invention is disclosed. The delivery gun 10 has a back handle 14 and a tubular housing 16 placed through a front handle 24. The housing 16 has an opening 18 on its proximal end through which the compule 12 can be placed. Once the compule 12 is placed through the opening 18, a piston 20 is advanced by pushing the back handle 14 by the operator, so that the actuating projection of the piston 22 forces the material contained within the compule 12 out of the nozzle 32.

Figure 1:
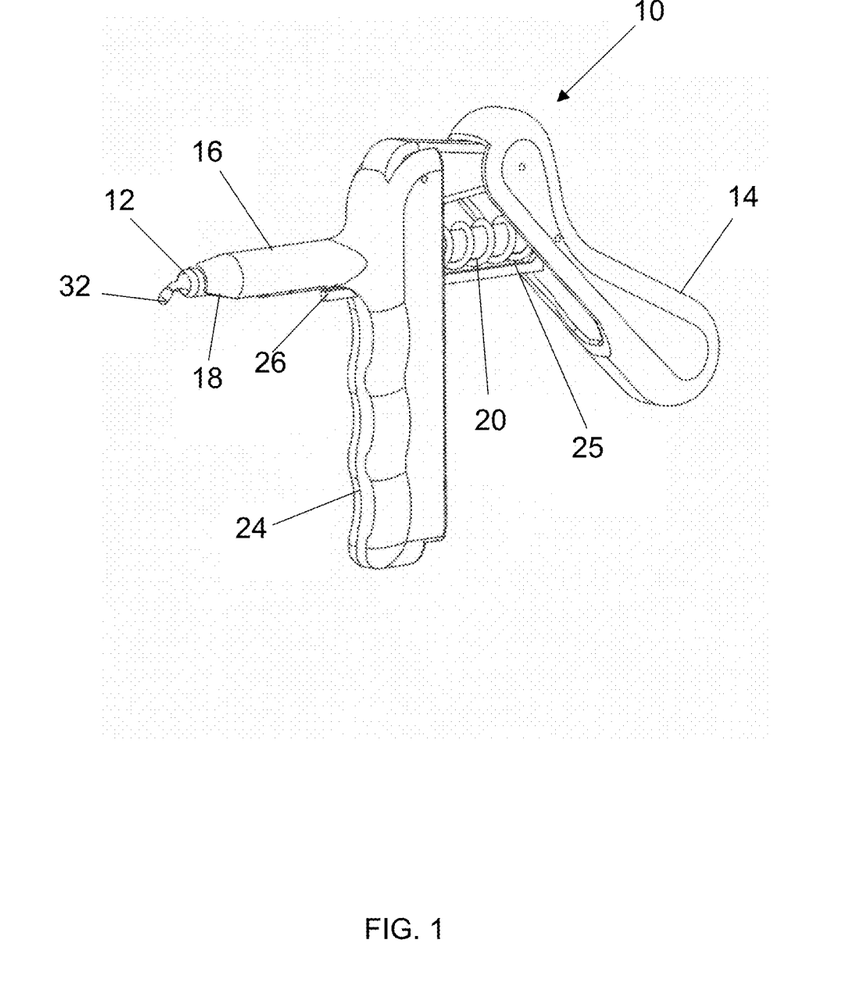
FIG. 1 is a perspective view illustrating the delivery gun of one embodiment of the present invention.
Figure 2A:
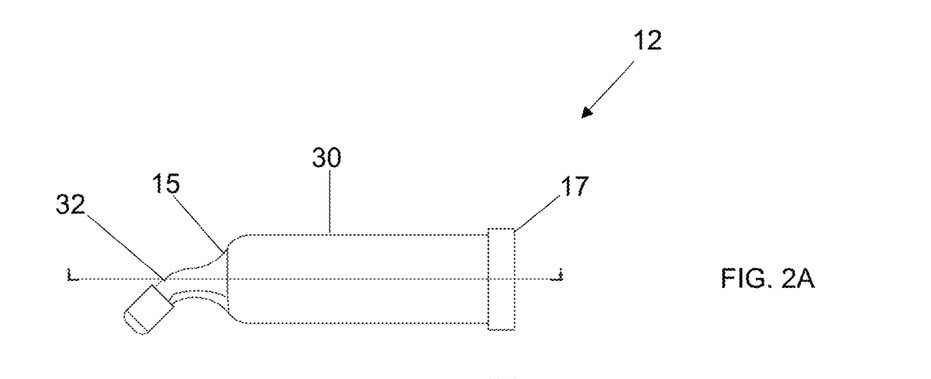
FIG. 2A is a perspective side view of the dental material carrier according to one embodiment of the present invention.
Figure 2B:
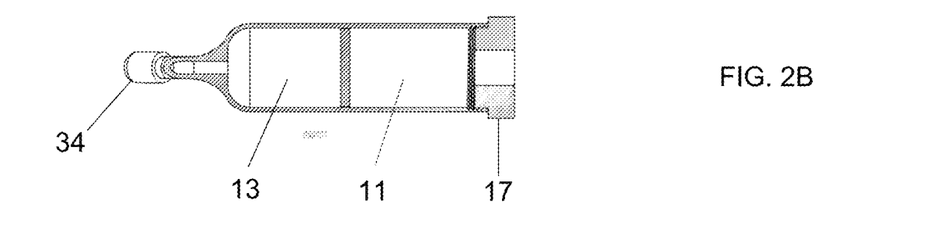
FIG. 2B is a perspective top view of the dental material carrier according to one embodiment of the present invention.
Figure 3:
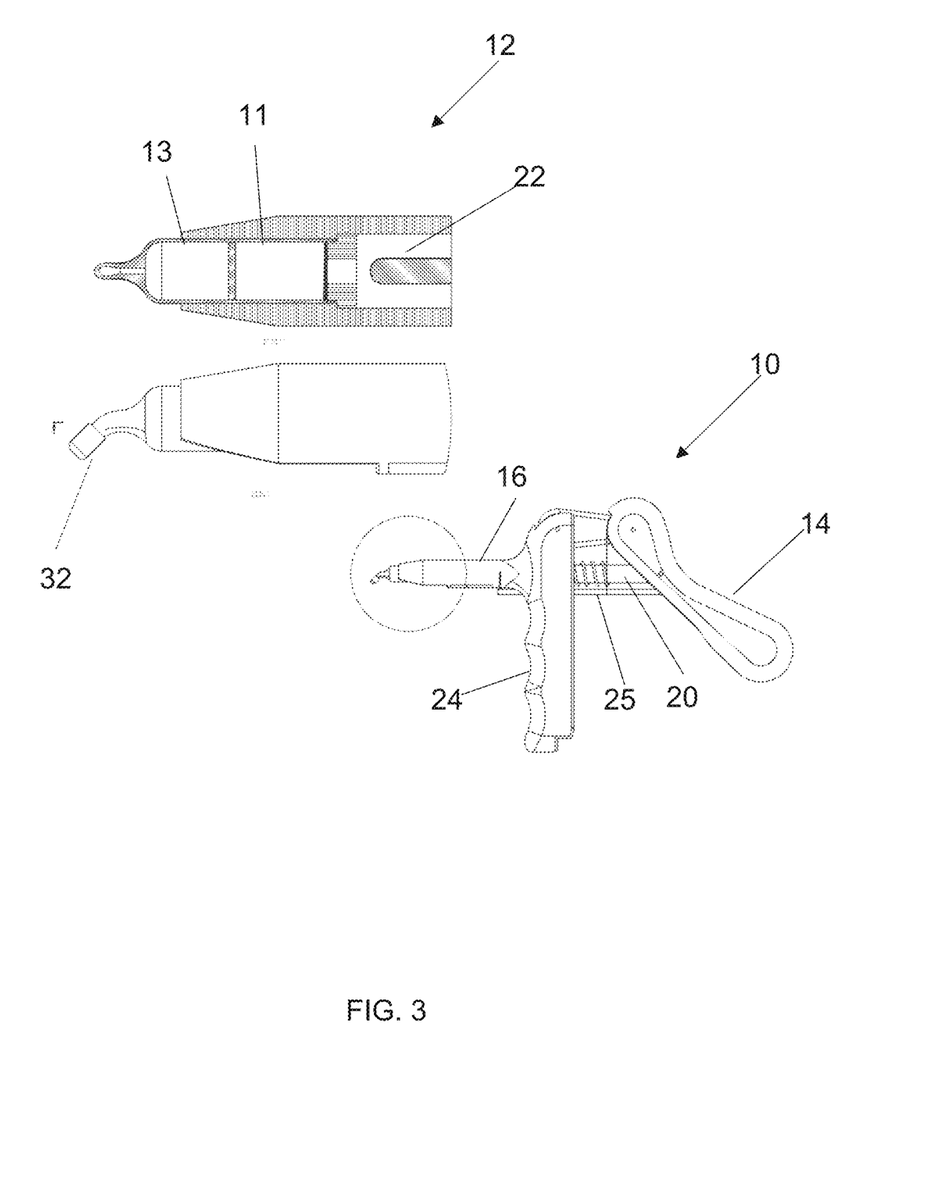
FIG. 3 is a perspective view illustrating the application system of one embodiment of the present invention.

FIGS. 2A and 2B illustrate a dental material carrier or compule 12 which is pre-loaded with a predetermined amount of dental material, e.g. composite resins, cement, etc. The compule 12 for this application is preferably constructed of a material opaque to the light. Typically, the dental material contained within a dental compule is sensitive to the light. The dental materials are stored in compules that are dark and are not see through. Therefore, in the application process the dentist cannot identify how much of

4 the material is left inside the compule. The compule 12 of the present invention provides colored makings on its outer surface that can be in various colors. In the preferred embodiment the compule 12 has scratchable colored markings in green 11 and red 13 as depicted in FIG. 2.

A shown in FIGS. 2A and 2B, the compule 12 is defined by a tubular body portion 30 which is adapted to contain the major amount of the predetermined measure of dental material. The Compule 12 has a proximal end 15 and a distal end 17. Communicating with the proximal end 15 is a discharge nozzle 32 that is sealed by a cap 34. In use, the dentist opens and places a compule 12 containing dental material into the dispenser member 10 from the opening 18.

Figure 4:
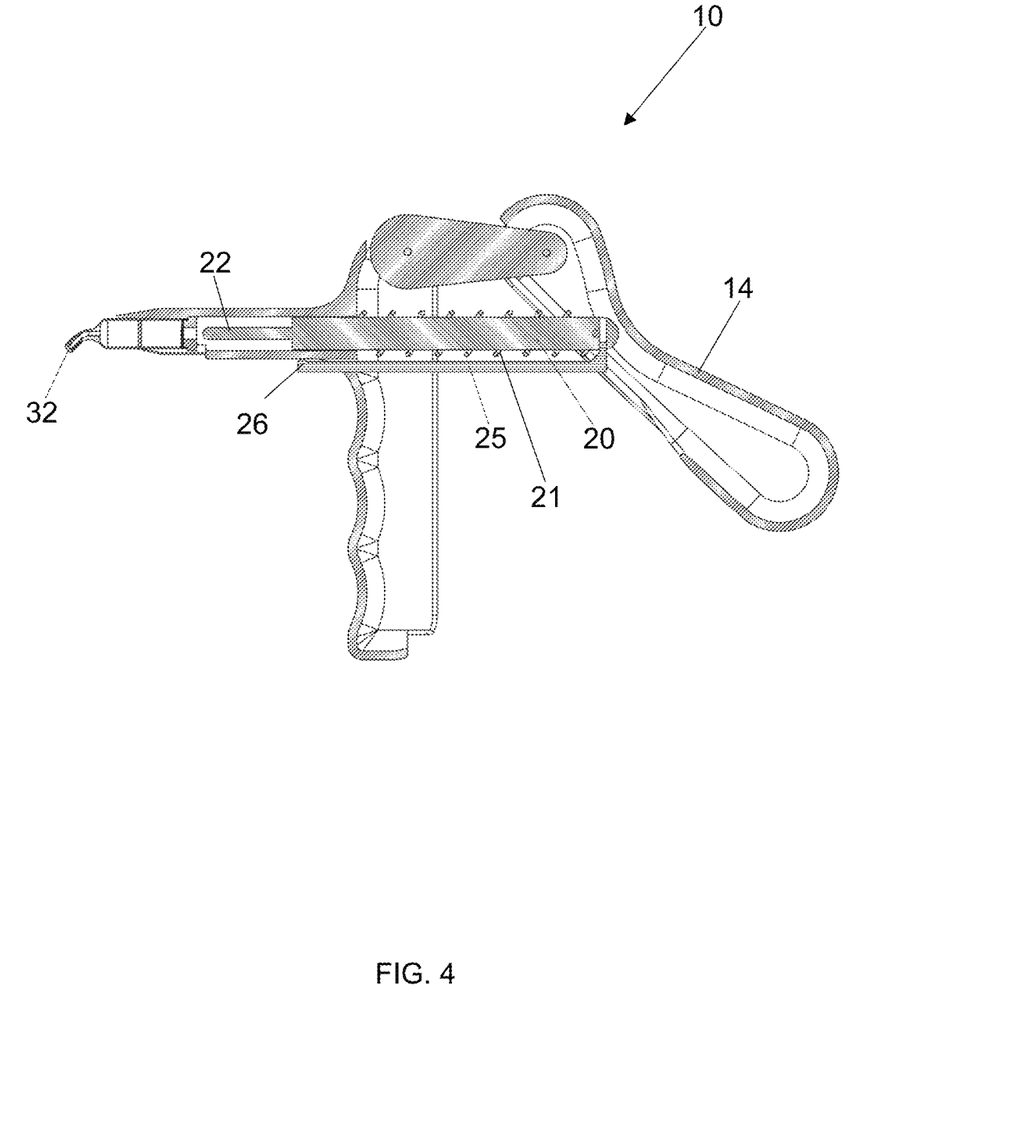
FIG. 4 is a cross section of one embodiment of the present invention according to FIG. 1.
Figure 5:
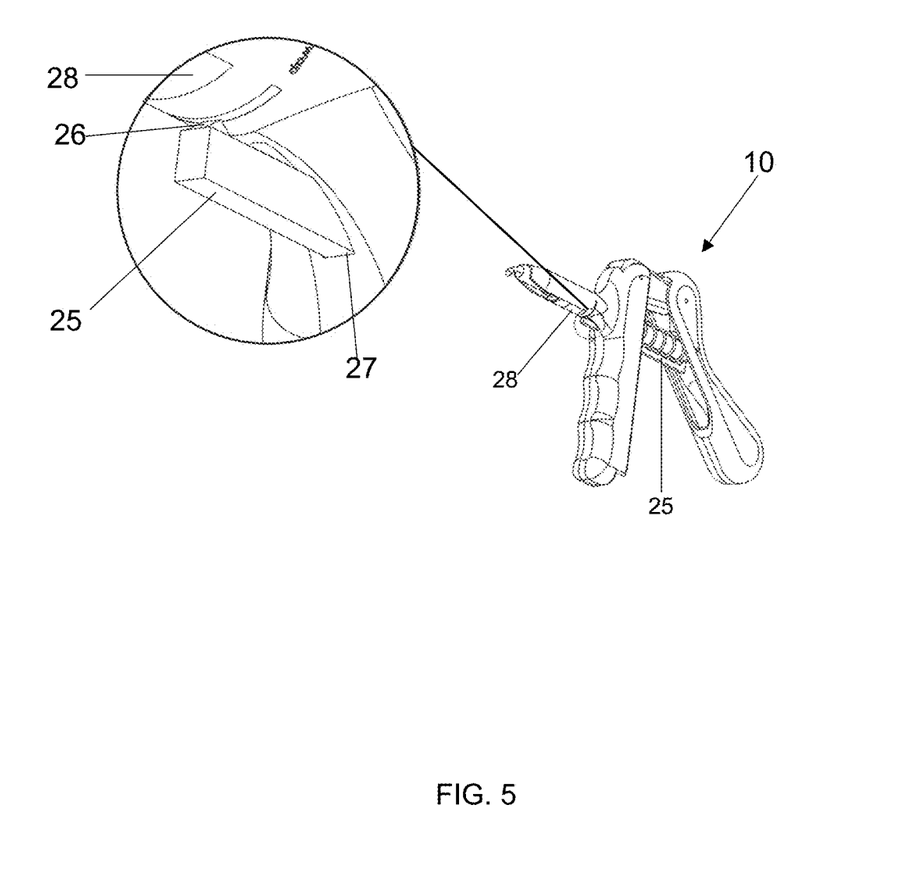
FIG. 5 is a partial sectional view of one embodiment of the present invention according to FIG. 1.
Figure 6:
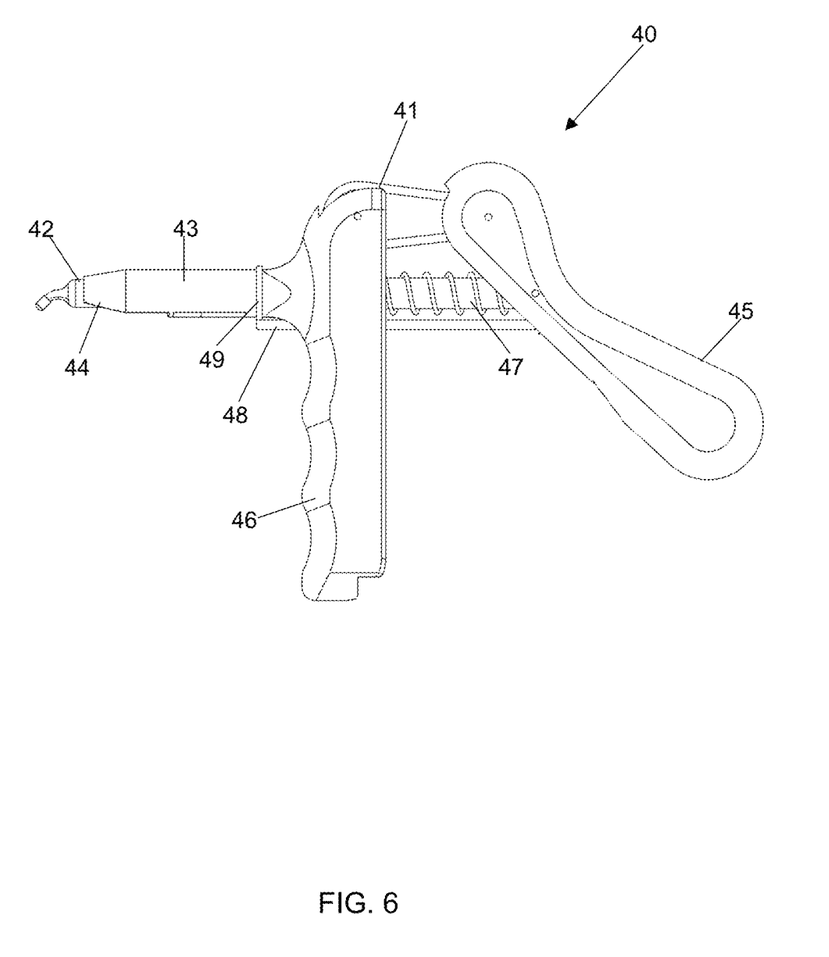
FIG. 6 is a perspective view of yet another embodiment of the present invention.
Figure 7:
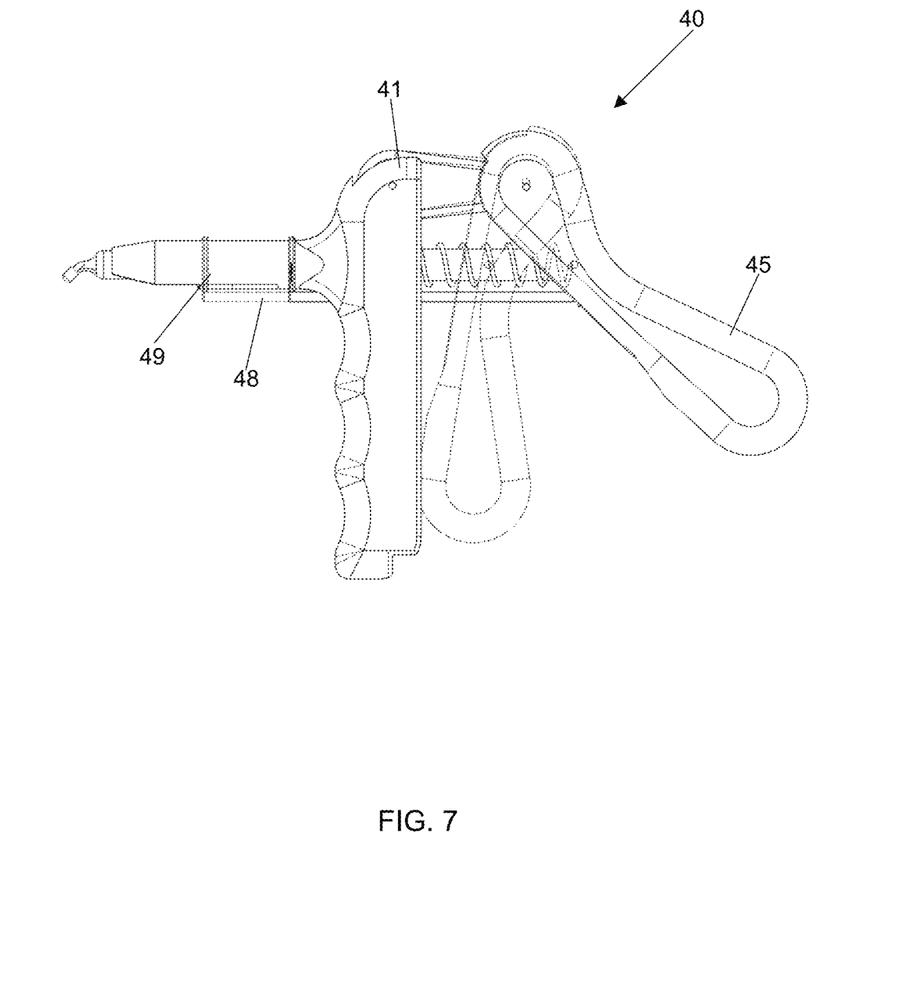
FIG. 7 is a perspective view of the embodiment of the present invention according to FIG. 6.

Referring to FIGS. 4 and 5 the piston 20 is slidable inside the compule 12 by springs 21 activated by the back handle 14. The piston 20 is an elongated rod which is connected and activated by the push handle 14. Connected to the extended end thereof is an actuating projection 22. To discharge the dental material, the piston 20 is pushed into the housing 16 of the gun so that the projection 22 is advanced into the compule 12 to extrude the material contained therein.

The piston 20 of the delivery gun 10 has a longitudinal bar 25 attached adjacent to the piston 20 and configured to move forwards and backwards in respect to the piston 20 through an opening 27. The bar 25 has a sharp pin 26 on the distal end of the bar 25 configured to scratch the colored markings 11 and 13 on the body of the compule 12 placed inside the housing of the delivery gun 10. The housing 16 has a longitudinal opening 28 along its bottom portion through which the longitudinal bar 25 protrudes and allows the sharp pin 26 on its distal end to scratch the colored markings on the compule by advancement of the piston 20 and the longitudinal bar 25.

The length of the longitudinal bar 25 is equal to the length of the piston 20. Thereby, by advancement of the piston 20 the bar 25 attached thereto moves forward and leaves markings on the body of the compule 12. In this case, if the handle 14 is released by the operator and the piston 20 returns back to its first position the markings show the amount of the dental material used inside the compule 12 and the amount of the material remaining therein.

In another embodiment as shown in FIG. 6 to 9 a modified form of the invention is shown 40. In this form the compule 42 further formed of an opaque or dark material to protect the dental material contained therein from light. The dispenser member 41 for receiving the compule 42 and dispensing the amount of dental material comprises a tubular housing 43 comprising a first opening on its tip portion 44 configured to receive the dental material carrier; a back handle 45 and a front handle 46.

Figure 8:
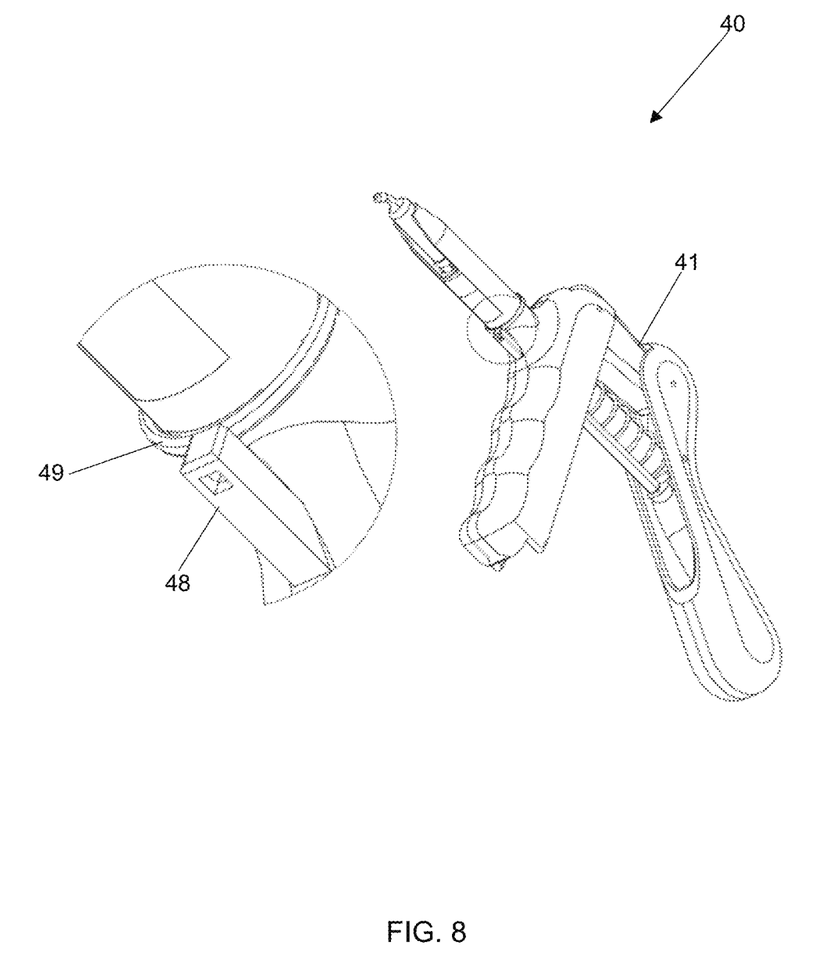
FIG. 8 is a partial sectional view of the embodiment of the present invention according to FIG. 6.

As shown in FIG. 8 the dispenser member 41 has a spring loaded piston member 47 with a piston tip which is advanced by the back handle 45 so that the piston tip forces the dental material contained within the dental material carrier 42 out of the nozzle. The dispenser device 41 includes a longitudinal bar 48 attached adjacent to the piston 47 and configured to move in respect to the piston 47. An O-ring 49 is slidably provided on the tubular housing 43 of the delivery gun and attached from the bottom portion to the distal end of the longitudinal bar 48. By advancement of the piston 47 and the longitudinal bar 48 the O-ring 49 slides forward from a first position to a second position (FIG. 7) on the housing 43 containing the compule 42 and locks in place facilitating the marking of the amount of the material used or remained within the compule 42.

Figure 9:
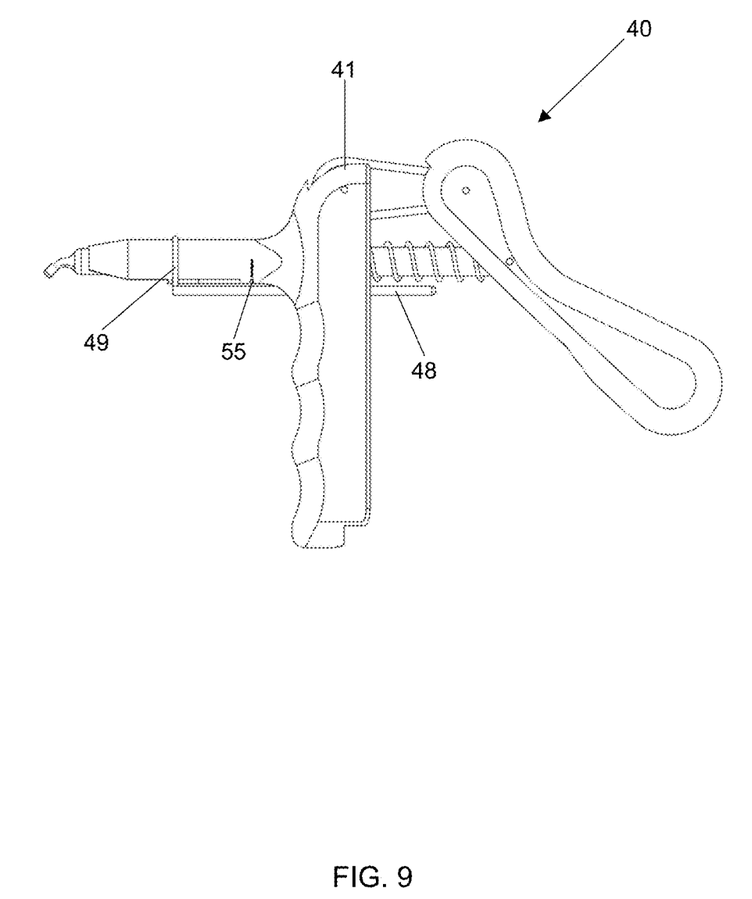
FIG. 9 is a perspective view of the embodiment of the present invention according to FIG. 6.

The system provides an anti-shifting member to lock the O-ring 49 in the position indicating the material inside the compule 42 and do not permit the O-ring 49 to slide back. This anti-shifting member or lock can be of any suitable lock members well known in the art. Referring to FIG. 9 the anti-shifting member 55 is used to lock the longitudinal bar 48 in place. The locking members 55 may be in the shape of locking balls and holes provided on the body and the longitudinal bar 48. The holes may be a series of longitudinally spaced holes in which operate locking balls or similar spherical elements to lock the longitudinal bar against longitudinal movement.

Figure 10:
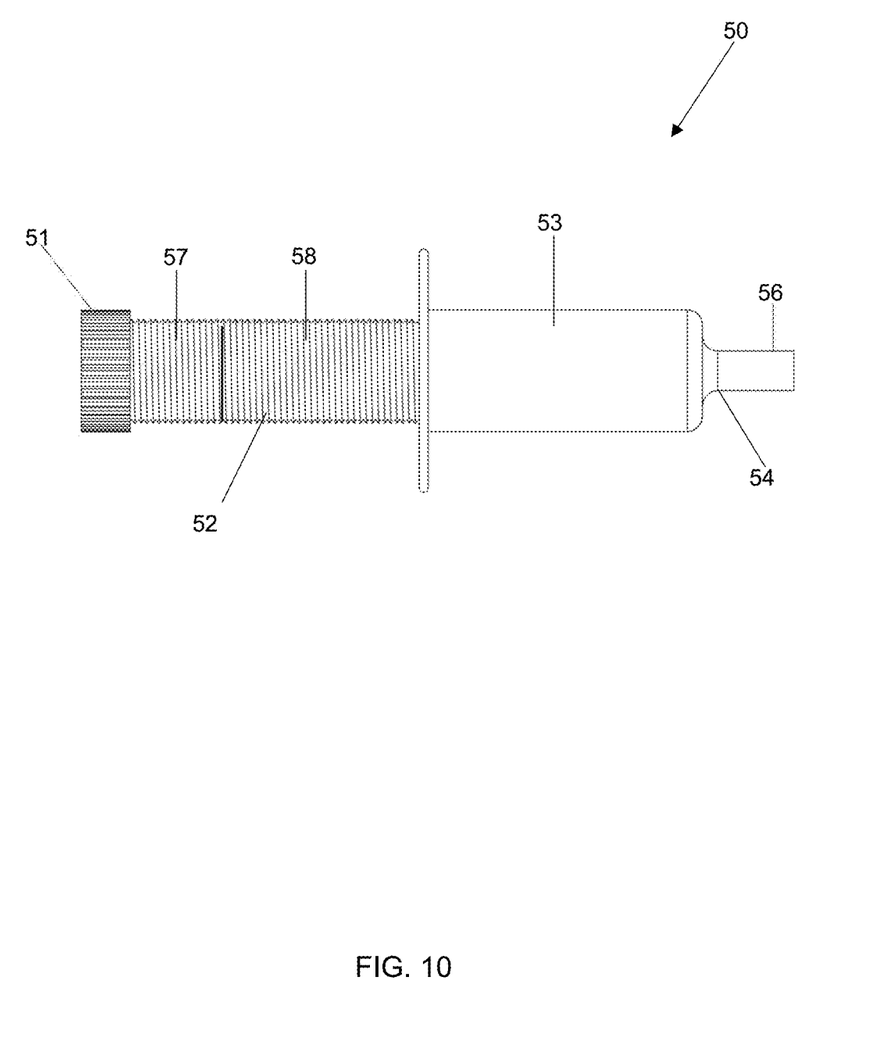
FIG. 10 is a perspective side view of another embodiment of the present invention.

FIG. 10 is yet another embodiment of the present invention 50. This kind of application of the dental material illustrates a delivery device comprising a handle 51 to receive a dental material carrier (Compule) 53. The handle 51 is rotated by hand to advance a screw type piston 52 inside the compule 53 for delivery of the dental material. The compule 53 is made of an opaque material. Therefore, dental material placed therein will be invisible to the dentist. The threaded piston 52 configured to be threaded into the compule 53. The compule 53 has a nozzle 54 that is sealed with a cap 56. By rotating the screw piston 52 by the dentist a proper amount of material is dispensed from the nozzle 54. There are colored markings 57 and 58 placed on the screw piston 52 to help indicate dosing. As the screw piston 52 rotates inside the compule 53, the colored markings with reference to the surface of the screw piston 52 indicate the amount of the material being used. The markings can be made of two alternating colors e.g. red and green, or more than two colors indicating multiple doses. In this way, the dentist can easily know the proper amount of material used and the amount of material remaining in the compule 53.

Figure 11:
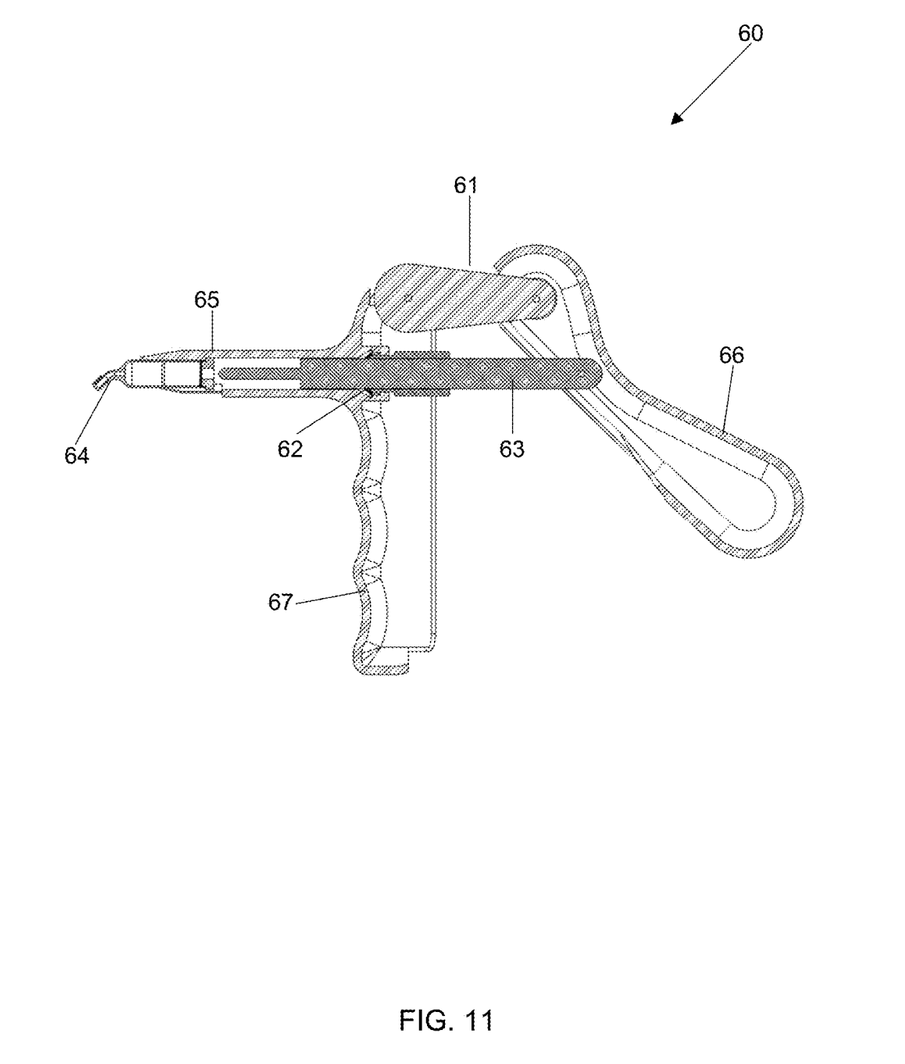
FIG. 11 is a cross-sectional view of another embodiment of the present invention.
Figure 12:
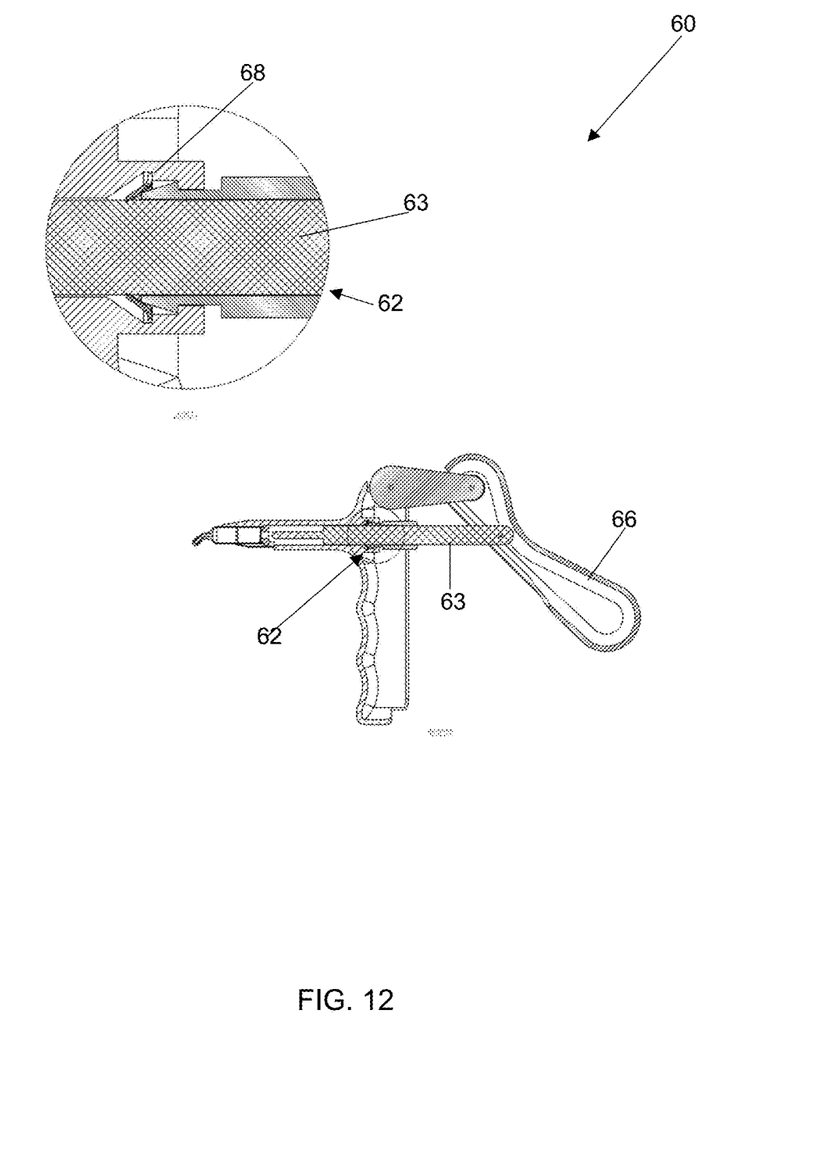
FIG. 12 is a cross-sectional view showing the mechanism of the present invention according to FIG. 11.
Figure 13:
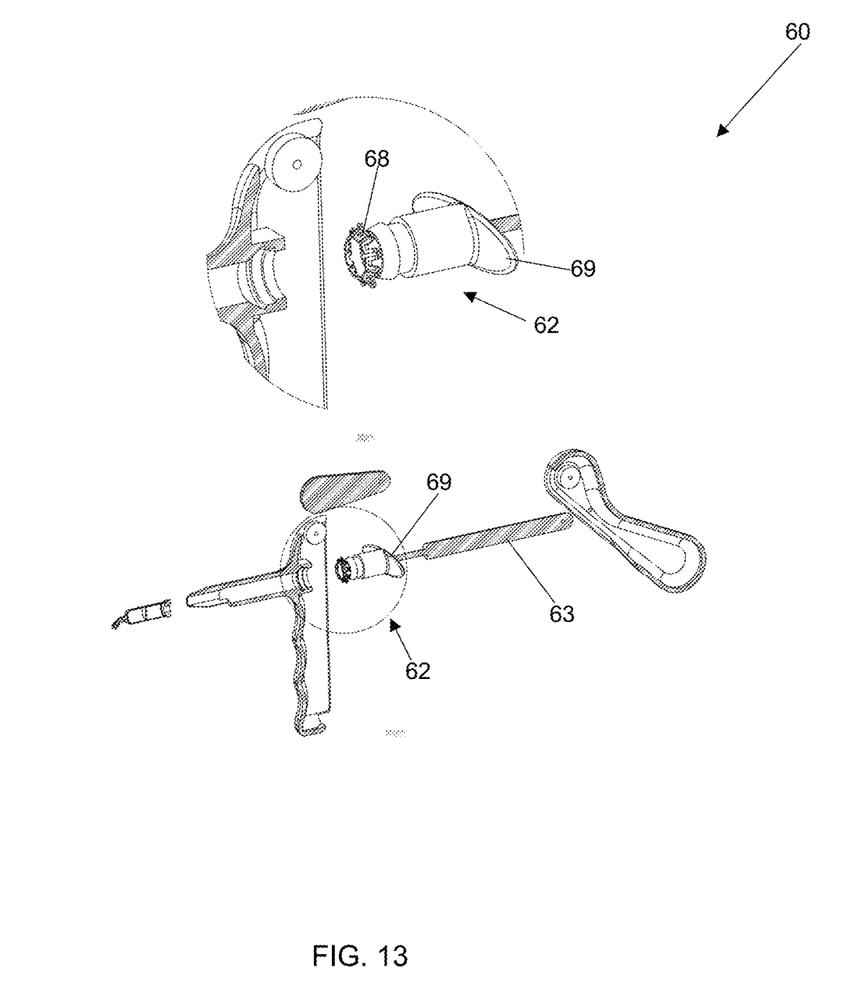
FIG. 13 is an exploded view of the embodiment of the present invention according to FIGS. 11 and 12.

FIGS. 11 to 13 show another embodiment of the present invention 60. In this application for marking an amount of dispensing the dental material the dispenser member 61 has a locking mechanism 62 to provide a one direction advancement of the piston 63. The dental material is displaced by the advancement of the piston 63 in the direction toward the nozzle 64.

The dispenser device 61 further has a tubular housing 65 comprising a first opening on its tip portion configured to receive the dental material carrier. The dispenser has a back handle 66, a front handle 67 and a piston member 63 disposed in frictional sliding contact within the tubular housing 65. The piston member is advanced by the back handle so that the piston tip forces the dental material contained within the dental material carrier out of the nozzle 64.

A locking mechanism 62 disposed on the piston 63 to provide a one direction movement of the piston 63 to move forward from a first position to a second position and prevent the piston to return back toward the first position. The piston 63 is linearly shifted along an axis and lock in the position thereby, facilitating the marking of the amount of the material used or remained within the carrier.

The locking mechanism 62 has an anti-shifting member 68 in the form of a spring loaded lock that locks the piston in the second position and prevent the piston to shift back into its starting position. The locking mechanism 62 further has a latch 69 to release the piston to re-load the dispenser device 61. The anti-shifting member 68 moves forward in respect to the piston 63 by the push of the back handle 66. When the handle 66 is released the anti-shifting member 68 locks the handle in place to prevent the piston to move back.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A dispenser system for dispensing an amount of dental material in a tooth comprising:
   1) a dispenser device comprising:
      a. a tubular housing, wherein the tubular housing has a first opening on a tip portion configured to receive a dental material carrier;
      b. a second longitudinal opening along a bottom portion;
      c. a back handle and a front handle;
      d. a spring loaded piston member in frictional sliding contact within the tubular housing, said piston member having a piston tip, wherein the piston member is advanced by the back handle and forces the piston tip to dispense the dental material contained within the dental material carrier, and
      e. a marking member configured to mark the amount of the dental material used inside the dental material carrier and the amount of the dental material remaining in it; and
   2) the dental material carrier, the dental material carrier received in the dispenser device, the dental material carrier comprising:
      a. a tubular body portion formed of an opaque or a dark material to protect the dental material contained therein from light, said tubular body portion has an outer surface, wherein the outer surface of the dental material carrier is a scratchable colored material, the tubular body portion further having an open end and a discharge end; and
      b. a nozzle attached to the discharge end to discharge the dental material; and wherein the marking member is a longitudinal bar having a sharp pin on a distal end, said longitudinal bar is attached adjacent to the piston member and configured to move with the piston member; and thereby, by advancement of the piston member the marking member moves forward toward the tubular housing and along the second longitudinal opening on the bottom portion of the housing, allowing the marking member to contact and scratch the scratchable colored material of the dental material carrier and mark the outer surface of said tubular body portion of the dental material carrier.

2. The system of claim 1, wherein the scratchable colored material comprises a red section towards the discharge end of the dental material carrier to warn that the dental material in almost finished.

3. The system of claim 1, wherein the dental material carrier is filled with a predetermined amount of the dental material including but not limited to composite resins and cement.

* * * * *